(12) United States Patent
Abernethy, Jr. et al.

(10) Patent No.: US 10,427,480 B2
(45) Date of Patent: Oct. 1, 2019

(54) CUSHIONED PROTECTION DEVICE

(71) Applicant: Prevent-A-Dent, LLC, Claremont, NC (US)

(72) Inventors: Joseph Michael Abernethy, Jr., Claremont, NC (US); Samuel Richard Foster, Conover, NC (US)

(73) Assignee: Prevent-A-Dent, LLC, Claremont, NC (US)

( * ) Notice: Subject to any disclaimer, the term of this patent is extended or adjusted under 35 U.S.C. 154(b) by 100 days.

(21) Appl. No.: 15/659,734

(22) Filed: Jul. 26, 2017

(65) Prior Publication Data

US 2018/0029430 A1 Feb. 1, 2018

Related U.S. Application Data

(60) Provisional application No. 62/366,747, filed on Jul. 26, 2016.

(51) Int. Cl.
*B60D 1/60* (2006.01)
*B60D 1/24* (2006.01)

(52) U.S. Cl.
CPC . *B60D 1/60* (2013.01); *B60D 1/24* (2013.01)

(58) Field of Classification Search
CPC .................. B60D 1/60; B60D 1/605
See application file for complete search history.

(56) References Cited

U.S. PATENT DOCUMENTS

| | | | | |
|---|---|---|---|---|
| 3,596,926 A | * | 8/1971 | Randall | B60D 1/60 280/507 |
| 5,037,122 A | * | 8/1991 | Beckerer, Jr. | B60D 1/60 150/166 |
| 5,806,873 A | * | 9/1998 | Glassman | B60D 1/60 150/166 |
| 6,412,806 B1 | * | 7/2002 | Peacock | B60D 1/60 150/166 |
| 8,196,949 B1 | * | 6/2012 | Hernandez | B60D 1/60 280/507 |

* cited by examiner

*Primary Examiner* — Kevin Hurley
(74) *Attorney, Agent, or Firm* — Shumaker, Loop & Kendrick, LLP

(57) ABSTRACT

A cushioned protection device may protect a tailgate of a tow vehicle from damage from a trailer. The cushioned protection device may be made from a polyethylene foam block having an internal cavity sized to fit snugly around a top portion of a crank jack attached to the trailer.

13 Claims, 19 Drawing Sheets

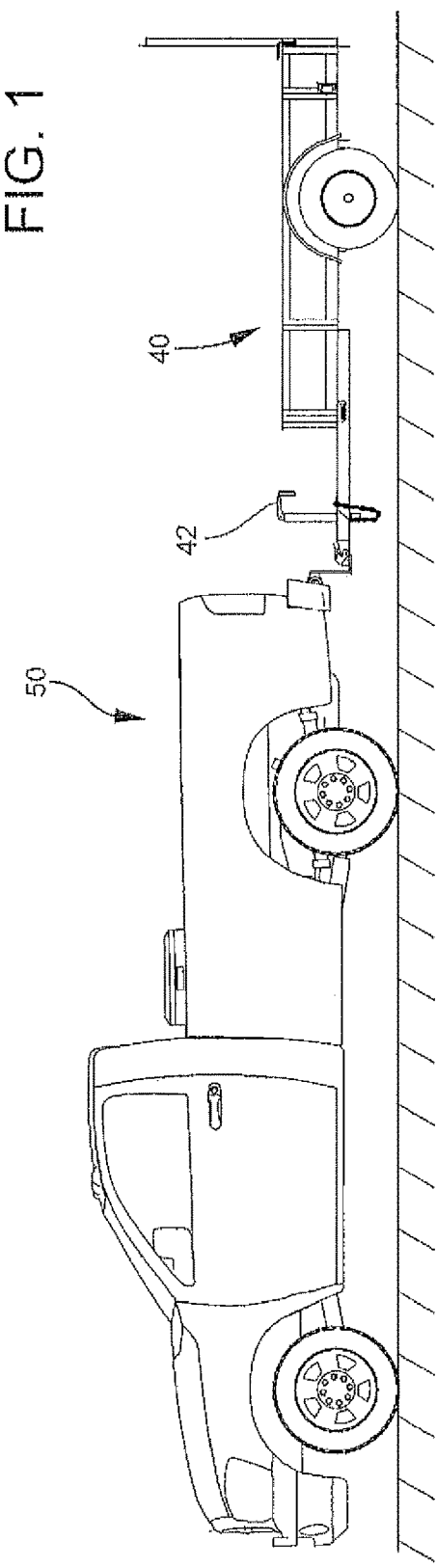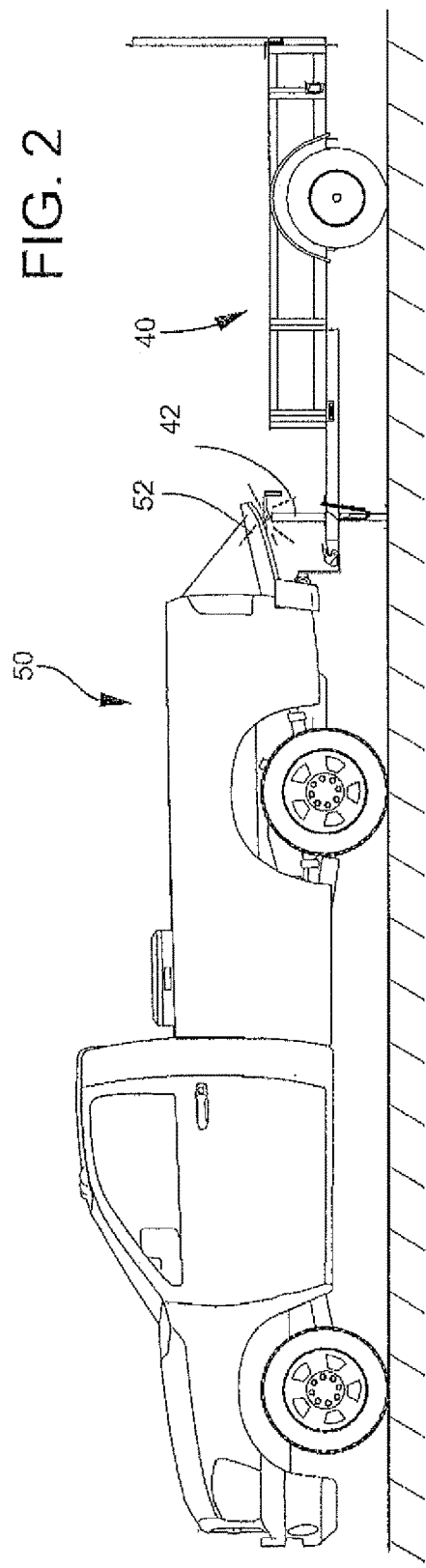

CUSHIONED PROTECTION DEVICE

CROSS-REFERENCE TO RELATED APPLICATIONS

This application is a non-provisional application tracing priority to U.S. provisional application having Ser. No. 62/366,747 filed on Jul. 26, 2016, the contents of which are expressly incorporated by reference in its entirety.

TECHNICAL FIELD AND BACKGROUND OF INVENTION

The invention relates to the field of cushions and more particularly to the field of cushioned protection.

Vehicles often tow trailers and other objects. In particular, a trailer may be temporarily connected to vehicle such as a truck or a van.

It is common for such tow vehicles to have a tailgate, door, window, or other opening device which is designed to open in a rearward direction relative a forward direction of the vehicle. For instance a door may swing out and a tailgate may swing down.

It is also common for a trailer or other object which is to be towed by a tow vehicle to have a jack, crank, winch, or other stabilization device located near the front of the trailer where it connects to the tow vehicle. Such device may aid in raising or lowering the trailer or otherwise stabilizing the trailer. Such device may be manual or may be automated.

Unfortunately, it also common for the above discussed tailgate, door, window, or other opening device to come into contact with the jack, crank, winch, or other stabilization device when the trailer and the tow vehicle are either connected or in close proximity. In many situations, the tailgate, door, window, or other opening device may be damaged by the contact with the jack, crank, winch, or other stabilization device.

Thus, there exists a need in the art for a device which protects the tow vehicle and, in particular, the tailgate, door, window, or other opening device of the tow vehicle.

SUMMARY OF THE INVENTION

It is thus an object of the present invention to provide a device which cushions and protects the tailgate, door, window, or other opening device of the tow vehicle from damage. As used hereinafter, "tailgate" shall refer to any and of a tailgate, door, window, or other opening device of a tow vehicle. It is a further object of the present invention to provide a device which cushions and protects a tailgate and is also lightweight and easily and cheaply manufactured. It is a further object of the present invention to provide a device which cushions and protects a tailgate and is environmentally friendly.

These and other aspects of the present invention are achieved by providing a cushioned protection device for protecting a tailgate of a tow vehicle from damage from a trailer comprising a foam block having an internal cavity sized to fit snugly around a top portion of a crank jack attached to the trailer.

According to one aspect of the invention, the foam block may be made of polyethylene foam.

According to one embodiment of the invention, the foam block includes an upper protection portion for protecting the tailgate from an initial impact, a central protection portion for providing rigidity and for providing a secondary cushioning, and a lower protection portion for securing the cushioned protection device to the crank jack.

According to another embodiment of the invention, the upper protection portion may be made from a foam having a density of 1.7 pounds per cubic foot. The central protection portion may be made from a foam having a density of 6 pounds per cubic foot. The lower protection portion may be made from a foam having a density of 1.65 pounds per cubic foot.

According to another embodiment of the invention, the upper protection portion may be a solid block having no internal cavity.

According to another embodiment of the invention, the lower protection portion may include a lower opening defining a lower portion of the internal cavity and a side opening.

According to another embodiment of the invention, the internal cavity may have a shape substantially conforming to the shape of the crank jack.

According to another embodiment of the invention, the foam block may be made from a single piece of foam.

According to another embodiment of the invention, the cushioned protection device may also include a slip covering fitting over the foam block for protecting the block from the elements, for securing the block to the crank jack, and for providing a means for applying advertising indicia.

According to another embodiment of the invention, the central protection portion may be adhered to the upper protection portion and the lower protection portion by one or more of a heat melt, a weld, or a glue.

According to another embodiment of the invention, the central protection portion may be less than 10% of the thickness of the upper protection portion.

According to another embodiment of the invention, the upper, central, and lower protection portions may each be made from a foam of a different density.

According to another embodiment of the invention, at least one of the upper, central and lower protection portions may be made from a recycled foam.

BRIEF DESCRIPTION OF THE DRAWINGS FIGURES

Features, aspects, and advantages of a preferred embodiment of the invention are better understood when the detailed description is read with reference to the accompanying drawing, in which:

FIG. 1 is an environmental view of a trailer attached to a tow vehicle;

FIG. 2 is a prior art environmental view of a trailer attached to a tow vehicle;

DETAILED DESCRIPTION

It is to be understood by a person having ordinary skill in the art that the present discussion is a description of exemplary embodiments only and is not intended as limiting the broader aspects of the present invention, The following example is provided to further illustrate the invention and is not to be construed to unduly limit the scope of the invention.

Figure 3:
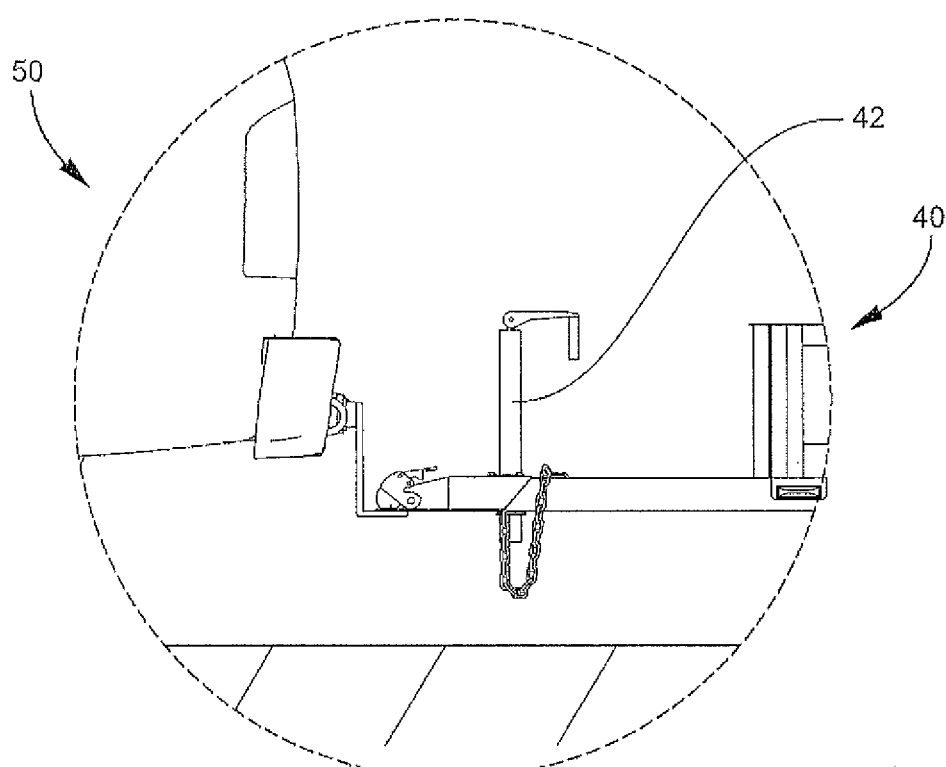
FIG. 3 is an environmental view • of a trailer attached to a tow vehicle and highlighting the crank, jack.
Figure 4:
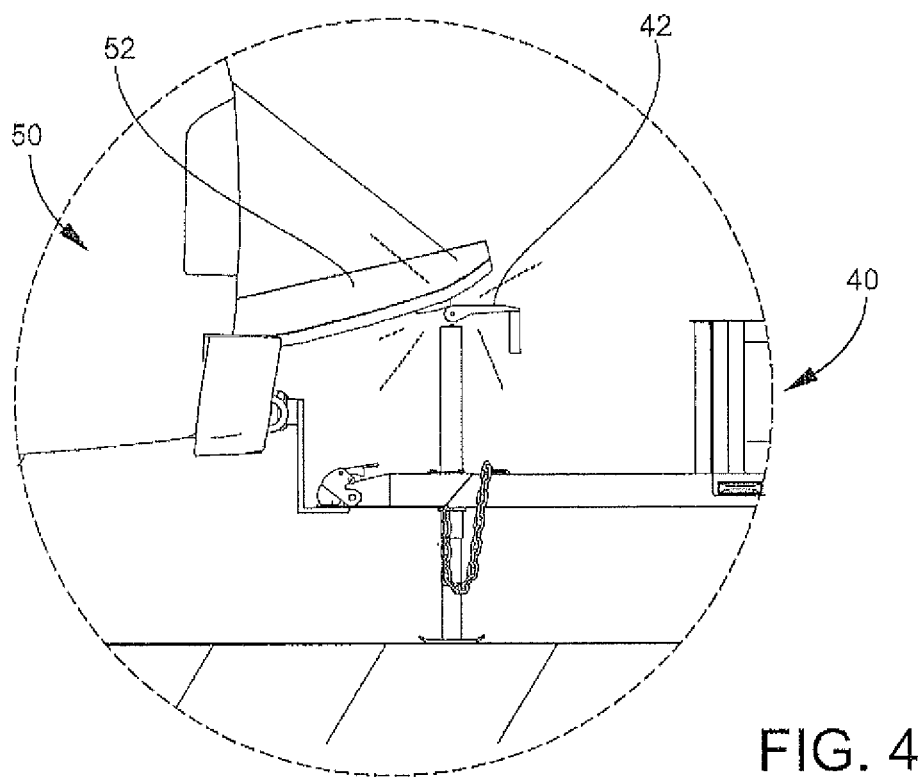
FIG. 4 is a prior art environmental view of a trailer attached to a tow vehicle and highlighting the tailgate contacting the crank jack.

Referring now specifically to the drawings, FIGS. 1, 2, 3 and 4 show a truck 50 having a tailgate 52 connected to a trailer 40. Trailer 40 has a crank jack 42 attached near a tongue portion of the trailer. As shown in FIGS. 2 and 4, the tailgate 52 of the truck 50 is prone to impacting the crank jack 42 of the trailer 40.

Figure 5:
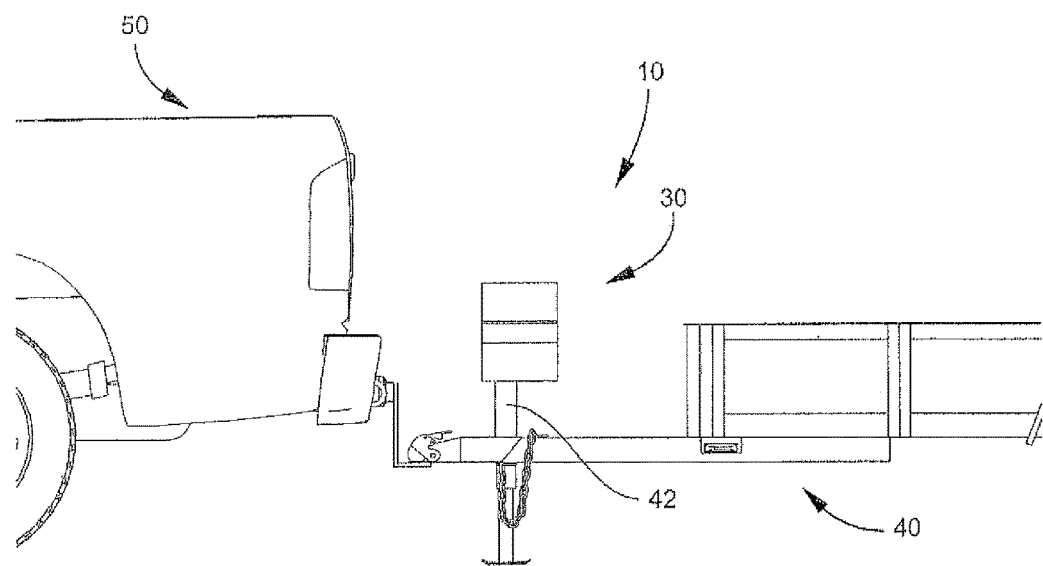
FIG. 5 is an environmental view of a trailer attached to a tow vehicle with an embodiment of the cushioned protection device installed on the crank jack.
Figure 6:
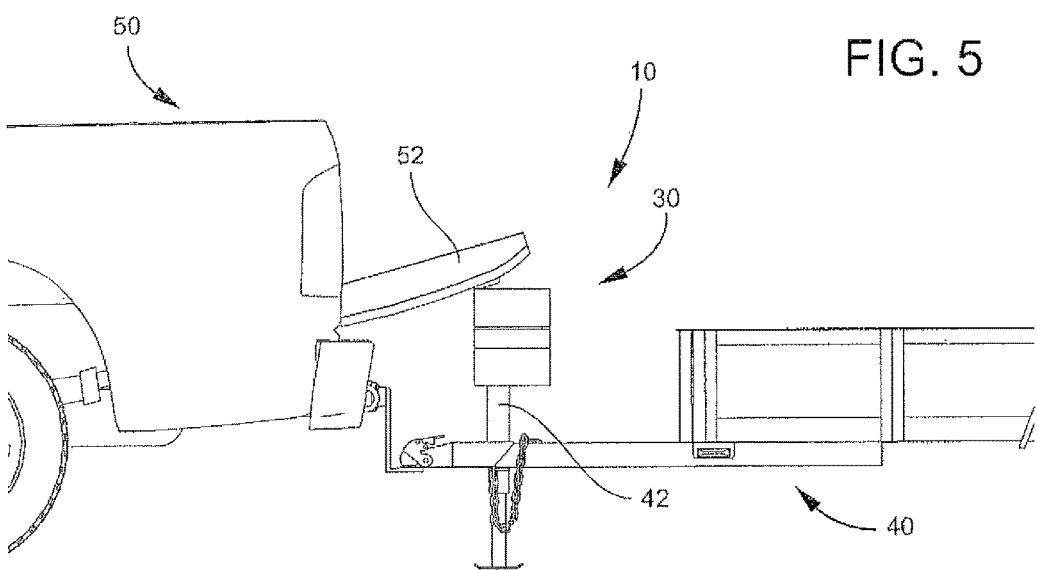
FIG. 6 is an environmental view of a trailer attached to a tow vehicle and highlighting the tailgate contacting an embodiment of the cushioned protection device which is installed on the crank jack.
Figure 7:
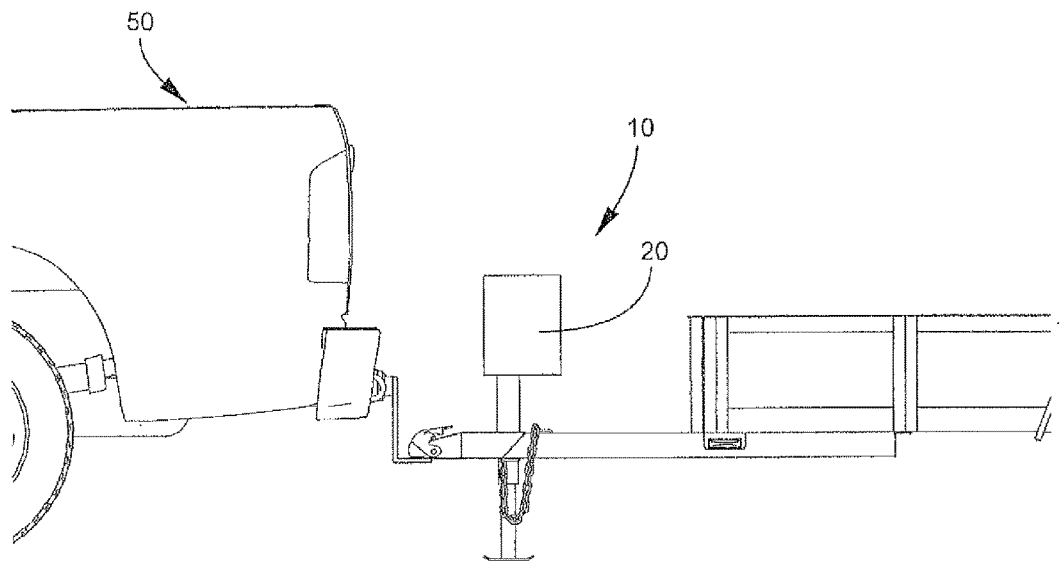
FIG. 7 is an environmental view of a trailer attached to a tow vehicle with an embodiment of the cushioned protection device installed on the crank jack.
Figure 8:
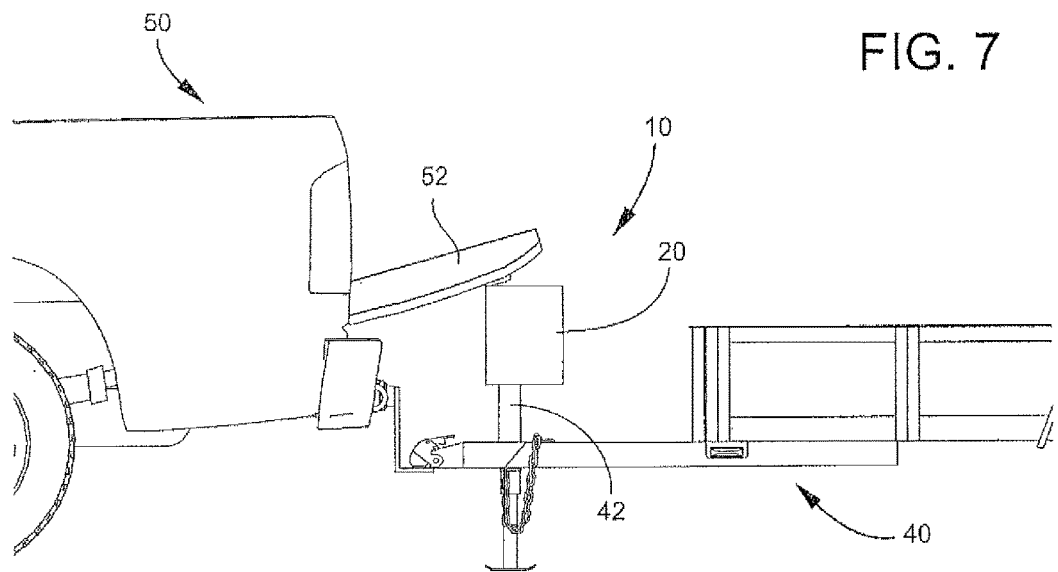
FIG. 8 is an environmental view of a trailer attached to a tow vehicle and highlighting the tailgate contacting an embodiment of the cushioned protection device which is installed on the crank jack.
Figure 9:
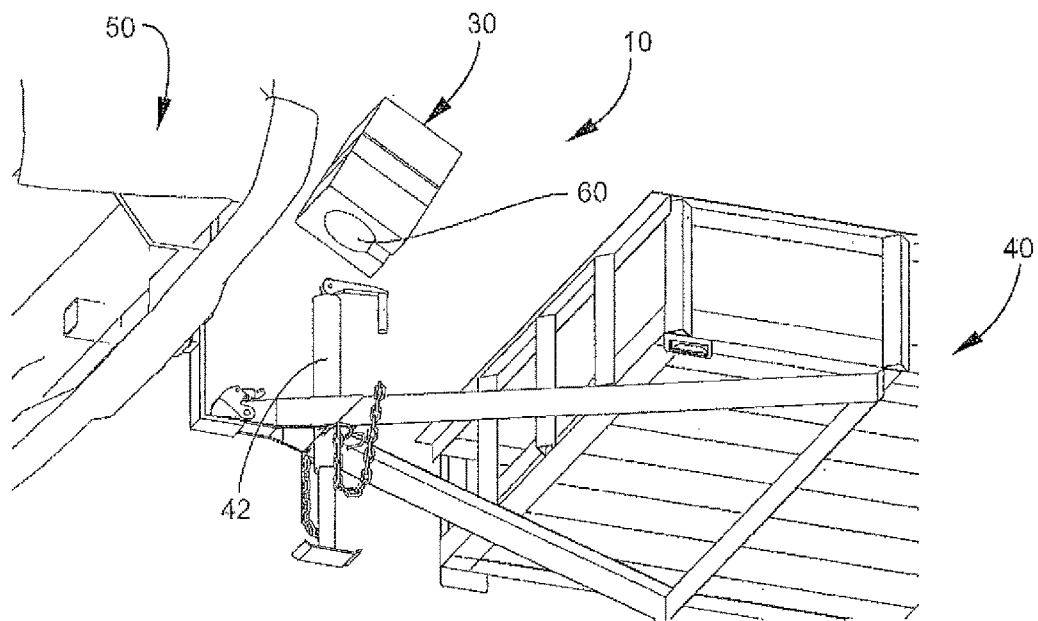
FIG. 9 is an environmental view of a trailer attached to a tow vehicle with an embodiment of the cushioned protection device being installed over the crank jack.
Figure 10:
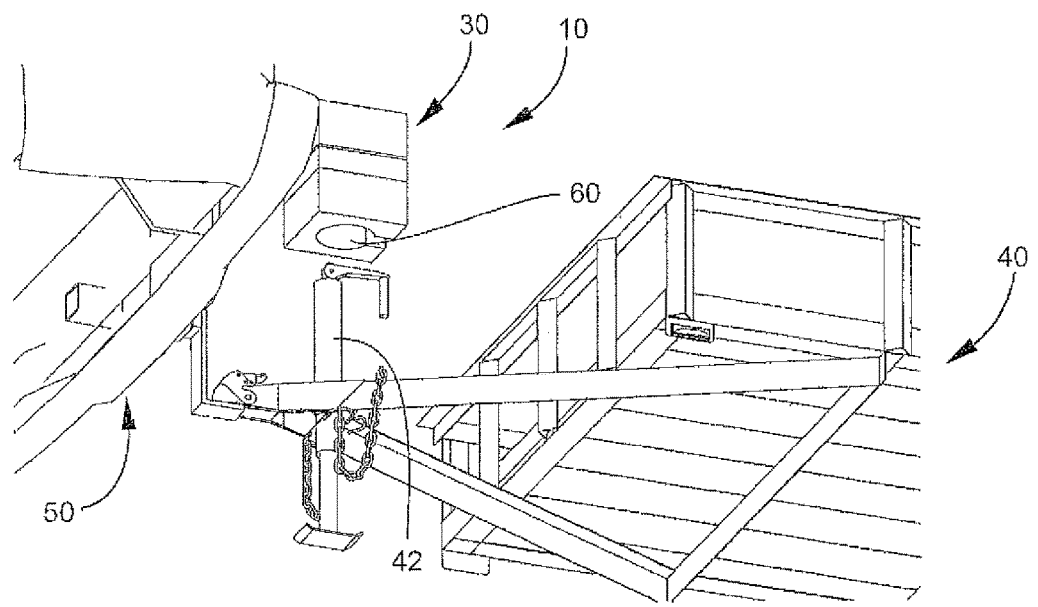
FIG. 10 is an environmental view of a trailer attached to a tow vehicle with an embodiment of the cushioned protection device being installed over the crank jack.
Figure 11:
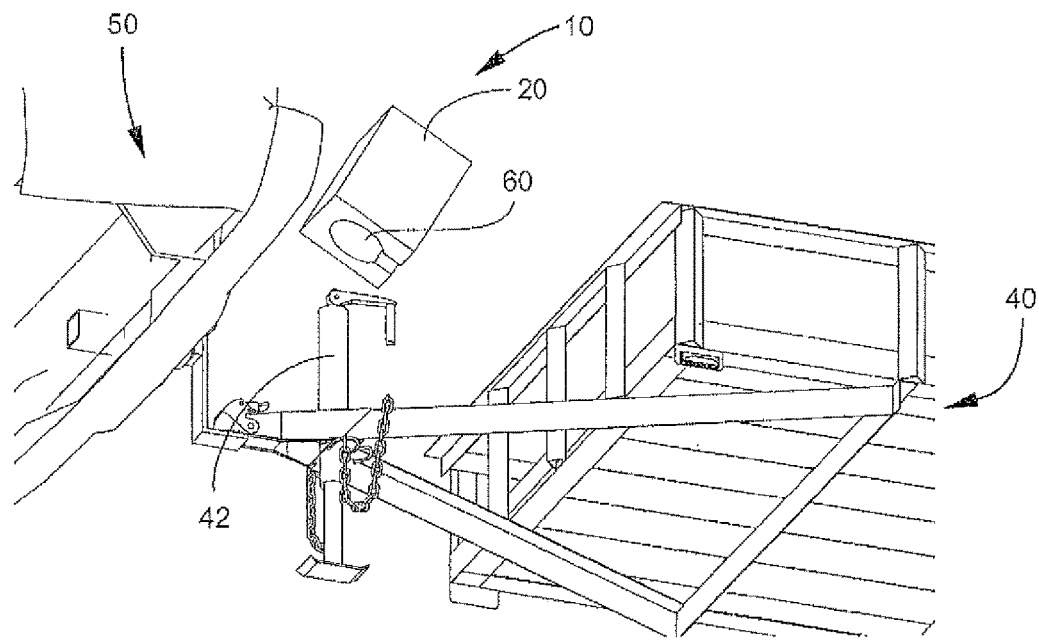
FIG. 11 is an environmental view of a trailer attached to a tow vehicle with an embodiment of the cushioned protection device being installed over the crank jack.
Figure 12:
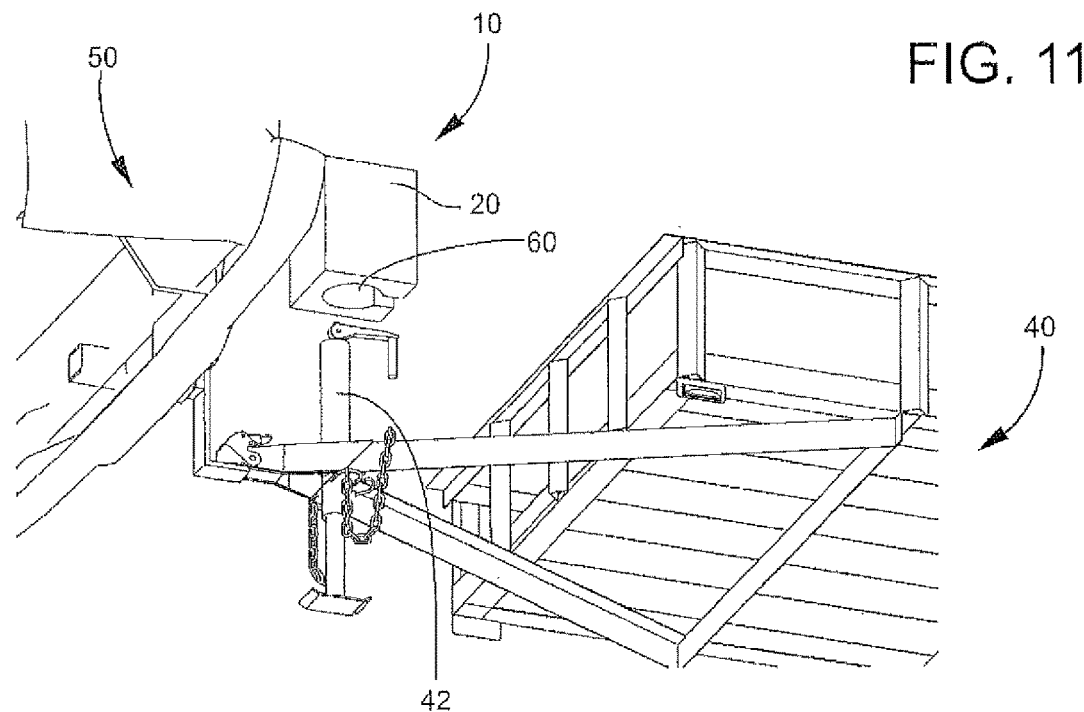
FIG. 12 is an environmental view of a trailer attached to a tow vehicle with an embodiment of the cushioned protection device being installed over the crank jack.
Figure 13:
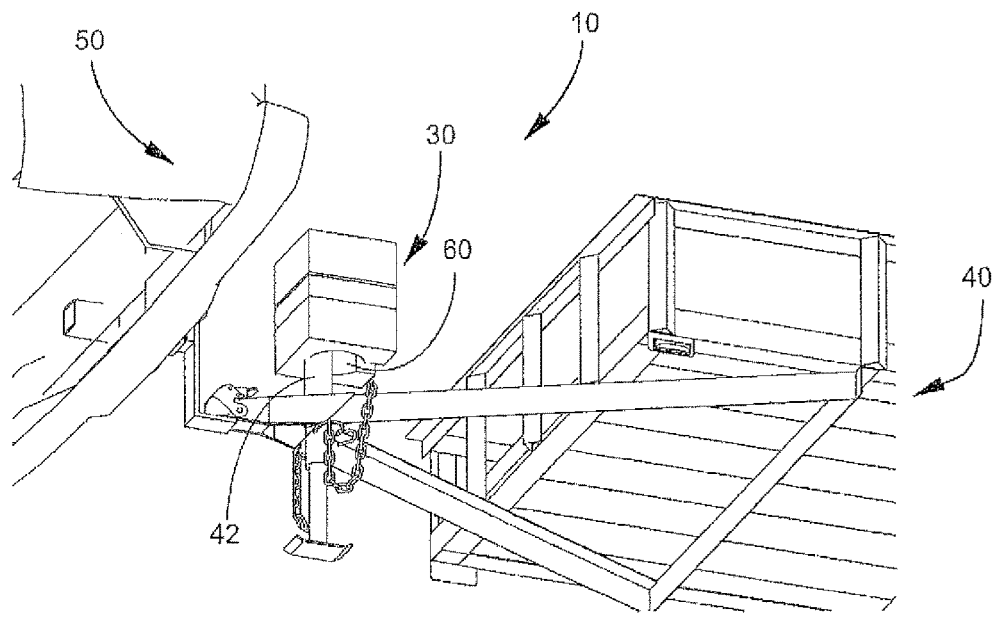
FIG. 13 is an environmental view of a trailer attached to a tow vehicle with an embodiment of the cushioned protection device being installed over the crank jack.
Figure 14:
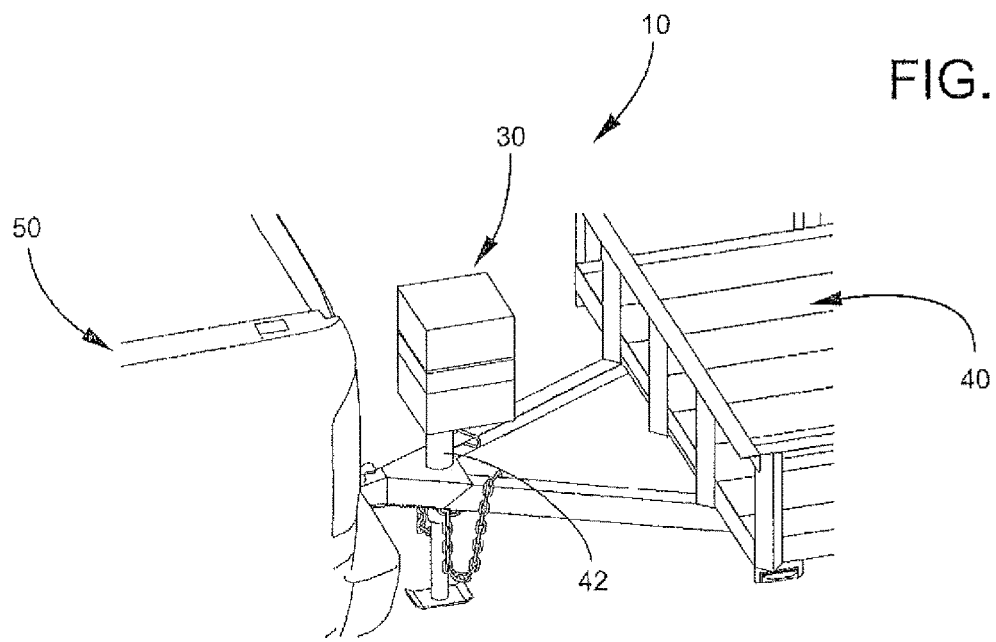
FIG. 14 is an environmental view of a trailer attached to a tow vehicle with an embodiment of the cushioned protection device being installed over the crank jack.
Figure 15:
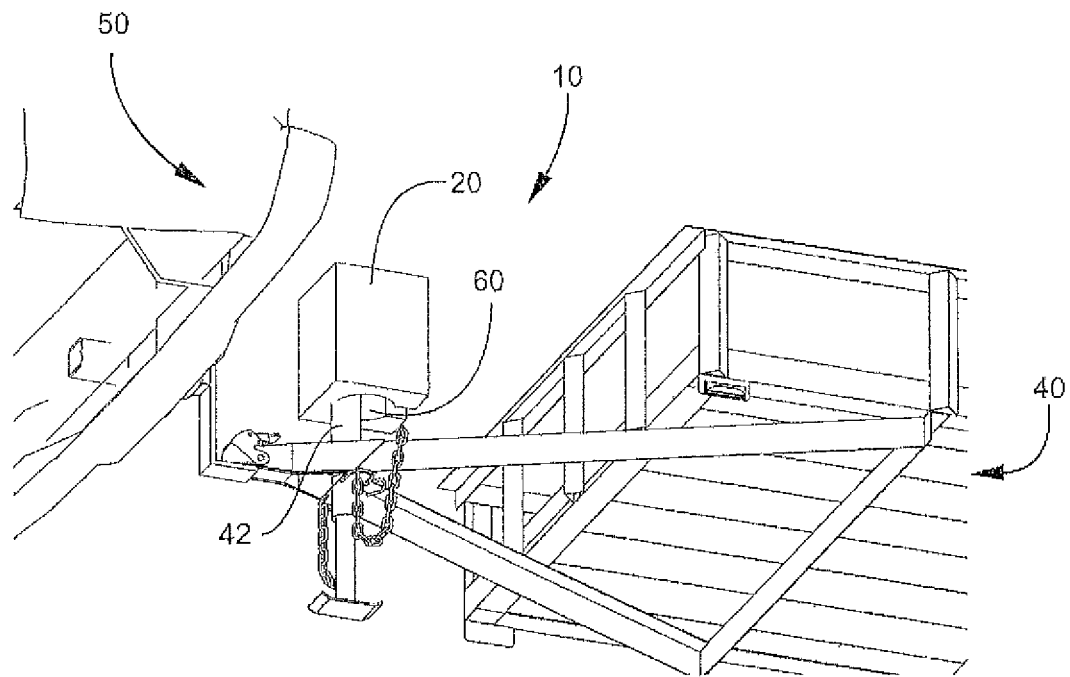
FIG. 15 is an environmental view of a trailer attached to a tow vehicle with an embodiment of the cushioned protection device being installed over the crank jack.
Figure 16:
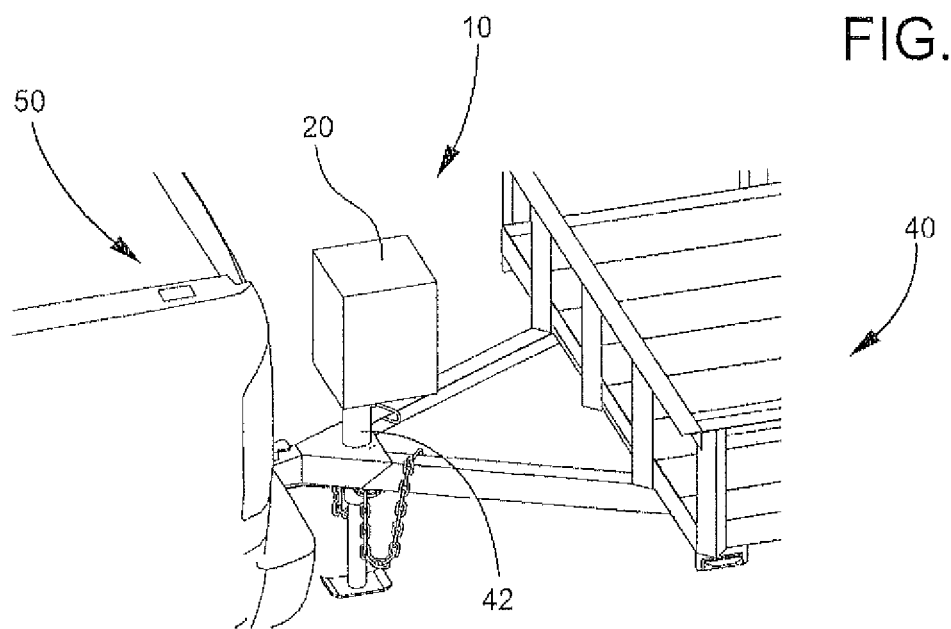
FIG. 16 is an environmental view of a trailer attached to a tow vehicle with an embodiment of the cushioned protection device being installed over the crank jack.
Figure 17:
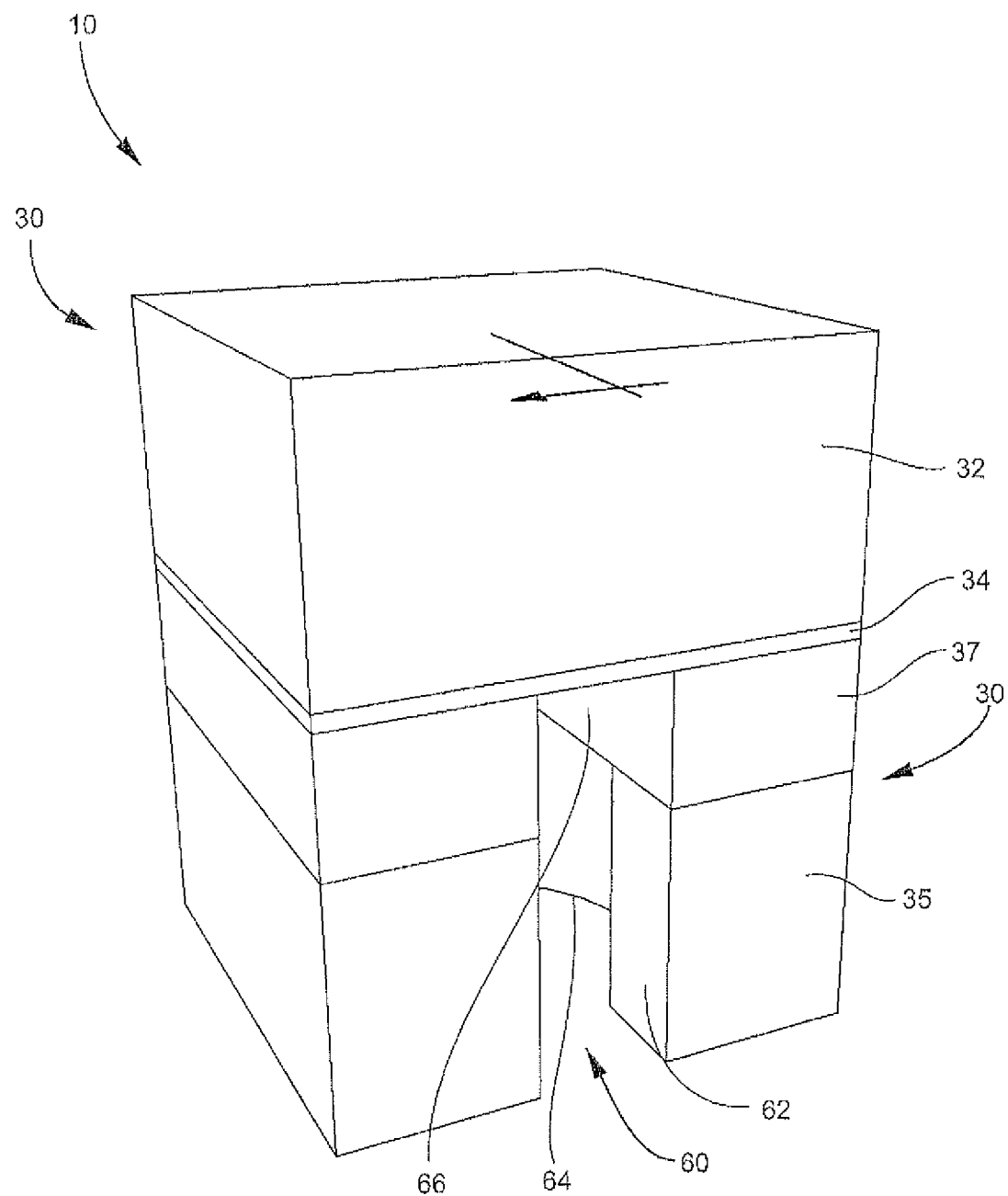
FIG. 17 is a front perspective view of an embodiment of the cushioned protection device.
Figure 18:
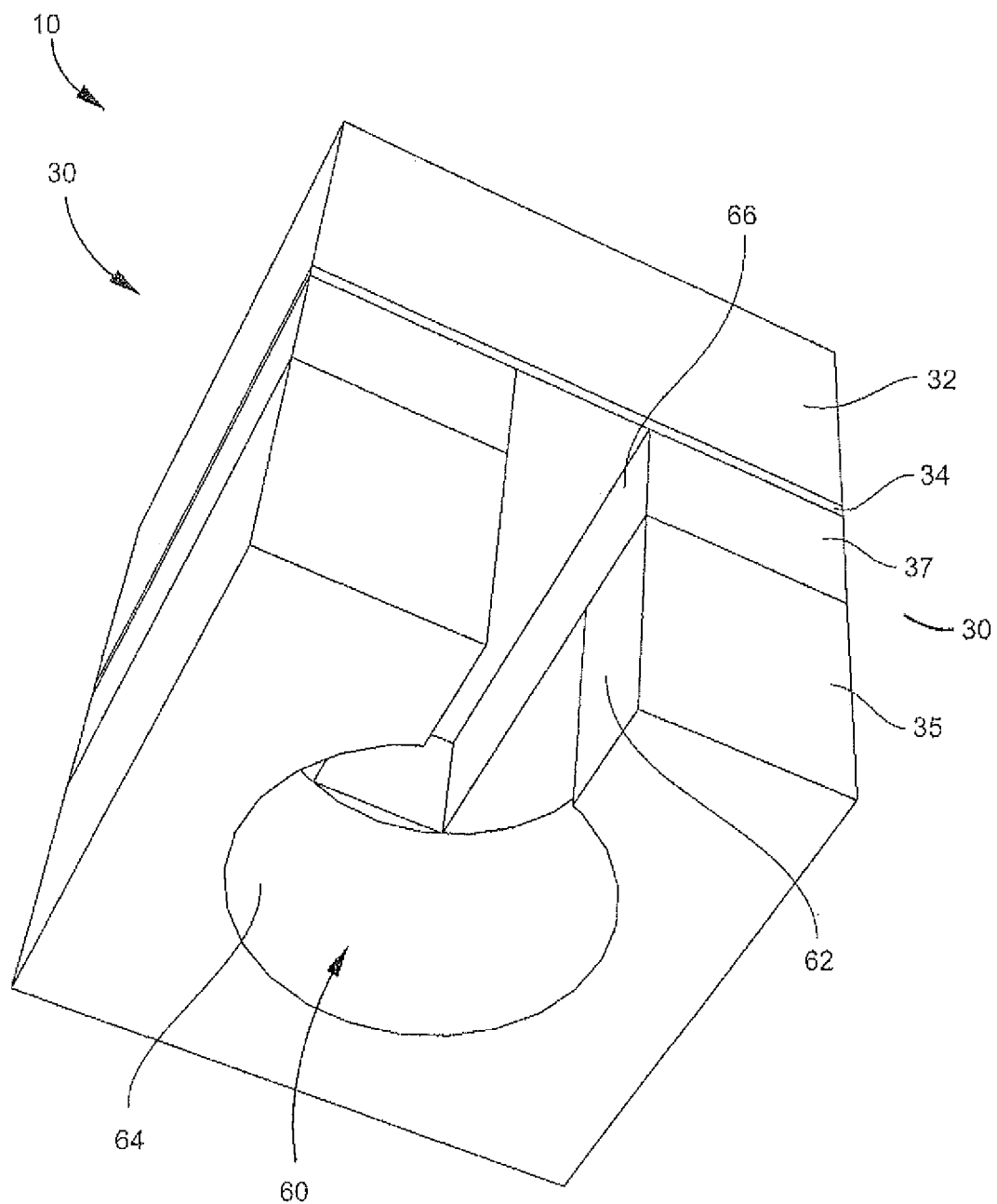
FIG. 18 is a bottom perspective view of an embodiment of the cushioned protection device.
Figure 19:
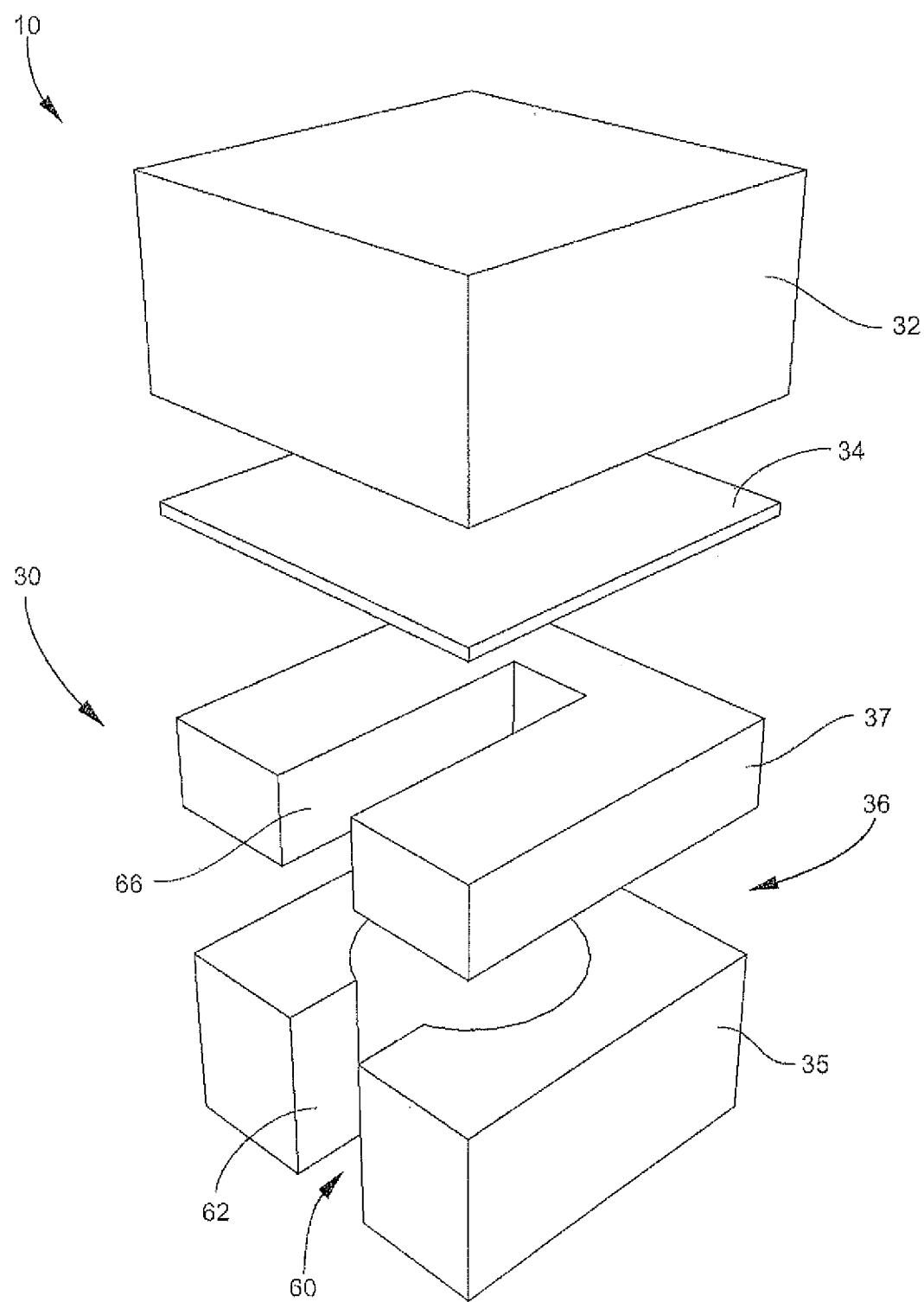
FIG. 19 is an exploded perspective view of an embodiment of the cushioned protection device.
Figure 20:
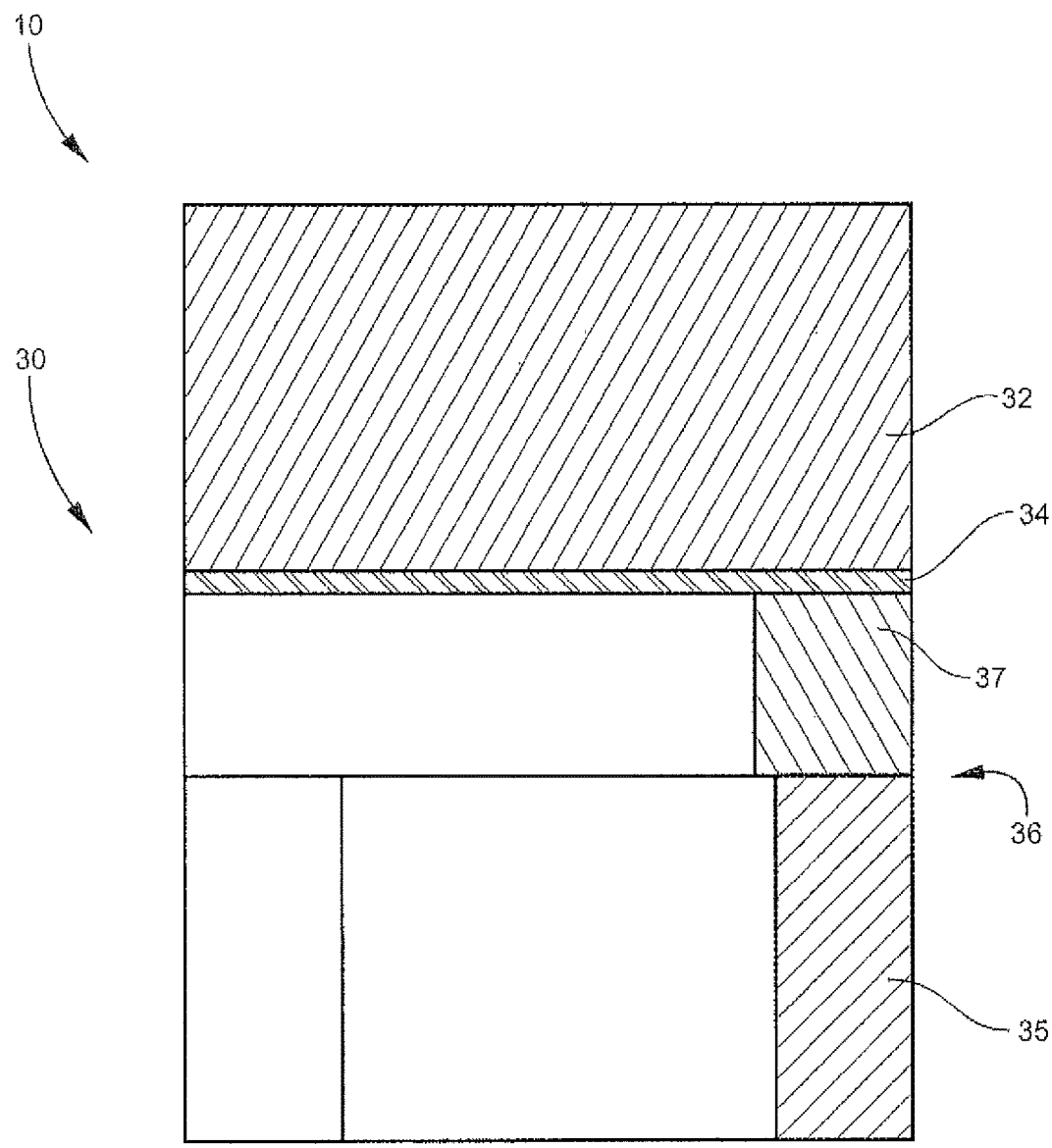
FIG. 20 is a sectional view from FIG. 17 of an embodiment of the cushioned protection device.

Referring to FIGS. 5, 6, 7, and 8, the cushioned protection device 10 of the present invention has been installed on the crank jack 42. As shown in FIG. 5, the cushioned protection device 10 may use a multipart design 30 that is made from different layers of foam. As shown in FIG. 7, the cushioned protection device 10 may also be constructed from a single piece of foam 20, As shown in FIGS. 6 and 8, when the cushioned protection device 10 is installed, it will protect the tailgate 52 of the truck 50 from the impact of the crank jack 42 of the trailer 40.

Referring to FIGS. 9, 10, 11, 12, 13, 14, 15, and 16, the cushioned protection device 10 slips over the crank jack 42. This is so with both the multipart design 30 of FIGS. 9, 10, 13, and 14 and the single foam design 20 of FIGS. 11, 12, 15, and 16. As shown in FIGS. 9-16, internal cavity 60 slides over the crank jack 42 and fits securely around the crank jack 42. The internal cavity 60 is sized to fit snugly over and around the crank jack 42. The spring properties of the foam of the cushioned protection device 10 hold the cushioned protection device 10 around the crank jack 22, As shown in FIGS. 17, 18, 19, 20, 21, 22, 23, and 27, the internal cavity 60 may include side opening 62, bottom opening 64, and upper portion 66. The internal cavity 60 has a plurality of internal surfaces which contact the crank jack 42 and generally correspond to the shape of the crank jack 42, The bottom opening 64 may have a shape which corresponds to the shaft of the crank jack 42. This shape may have at least a partial circular cross-section. The bottom opening 64 is shaped to accept and to be installed over the crank jack 42. The side opening 62 works in conjunction with the bottom opening 64 in order to surround the crank jack 42. In some embodiments (not shown) the side opening may be optional as the entirety of the crank jack may fit within the cavity without need for the side opening 62. In some embodiments, the side opening 62 is designed to accommodate a handle portion of the crank jack 42 whereas the bottom opening is primarily designed to accommodate the shaft portion of the crank jack 42. Similarly, the upper portion is designed to house that portion of the crank jack 42 which is located above the shaft portion of the crank jack 42. The upper portion 66 may have a rectangular cross-section.

Figure 21:
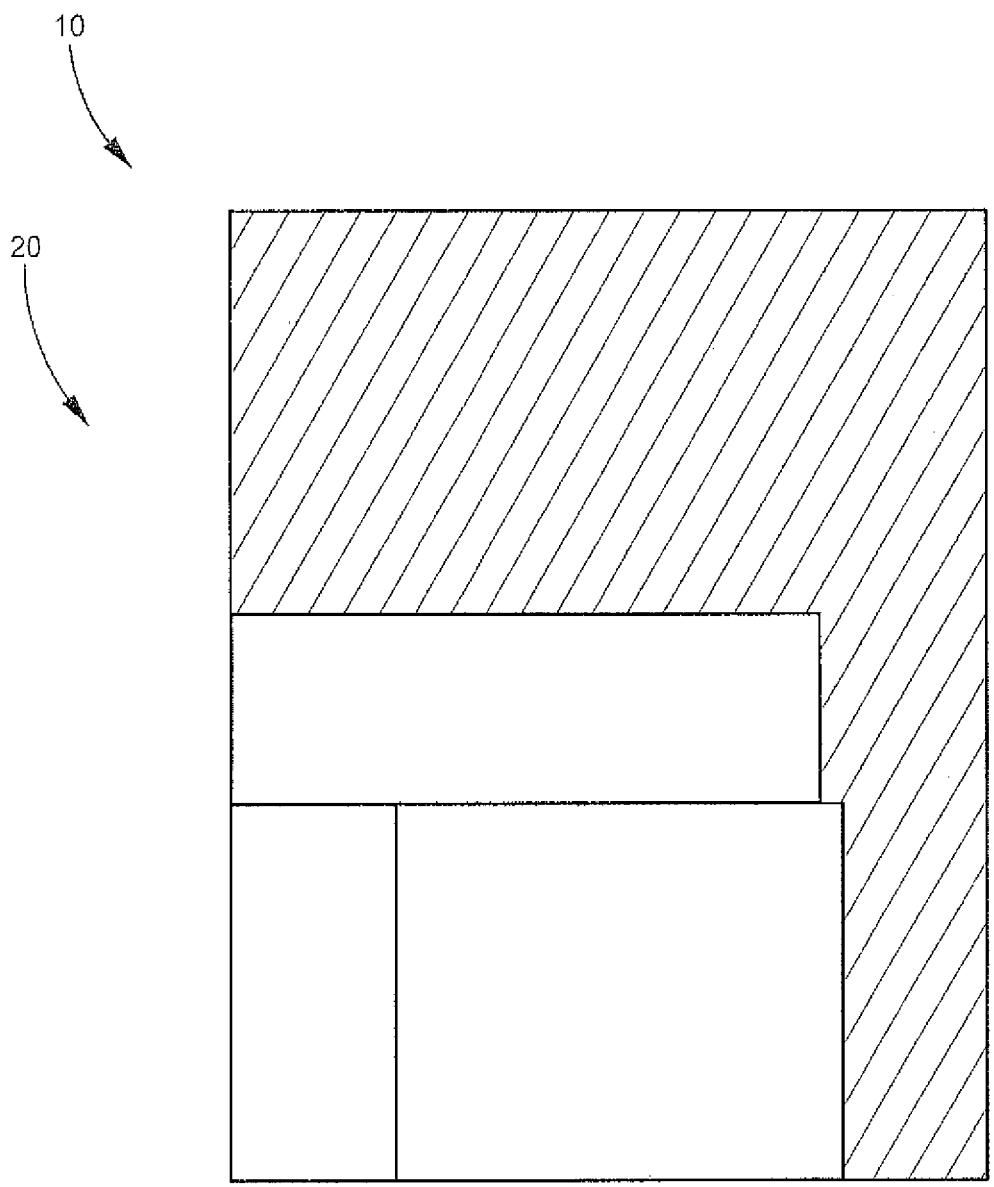
FIG. 21 is a sectional view of an embodiment of the cushioned protection device.
Figure 22:
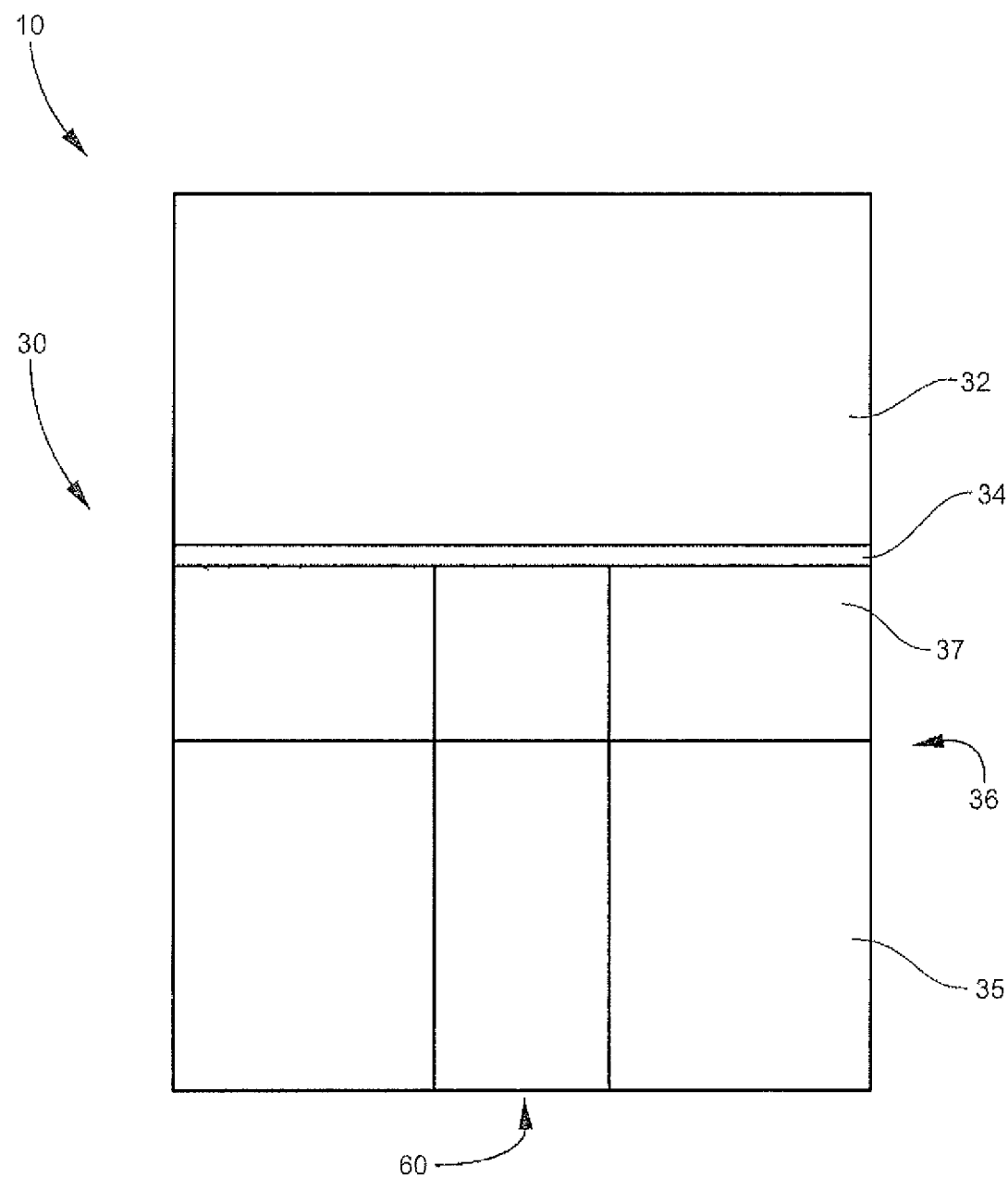
FIG. 22 is a front side view of an embodiment of the cushioned protection device.
Figure 23:
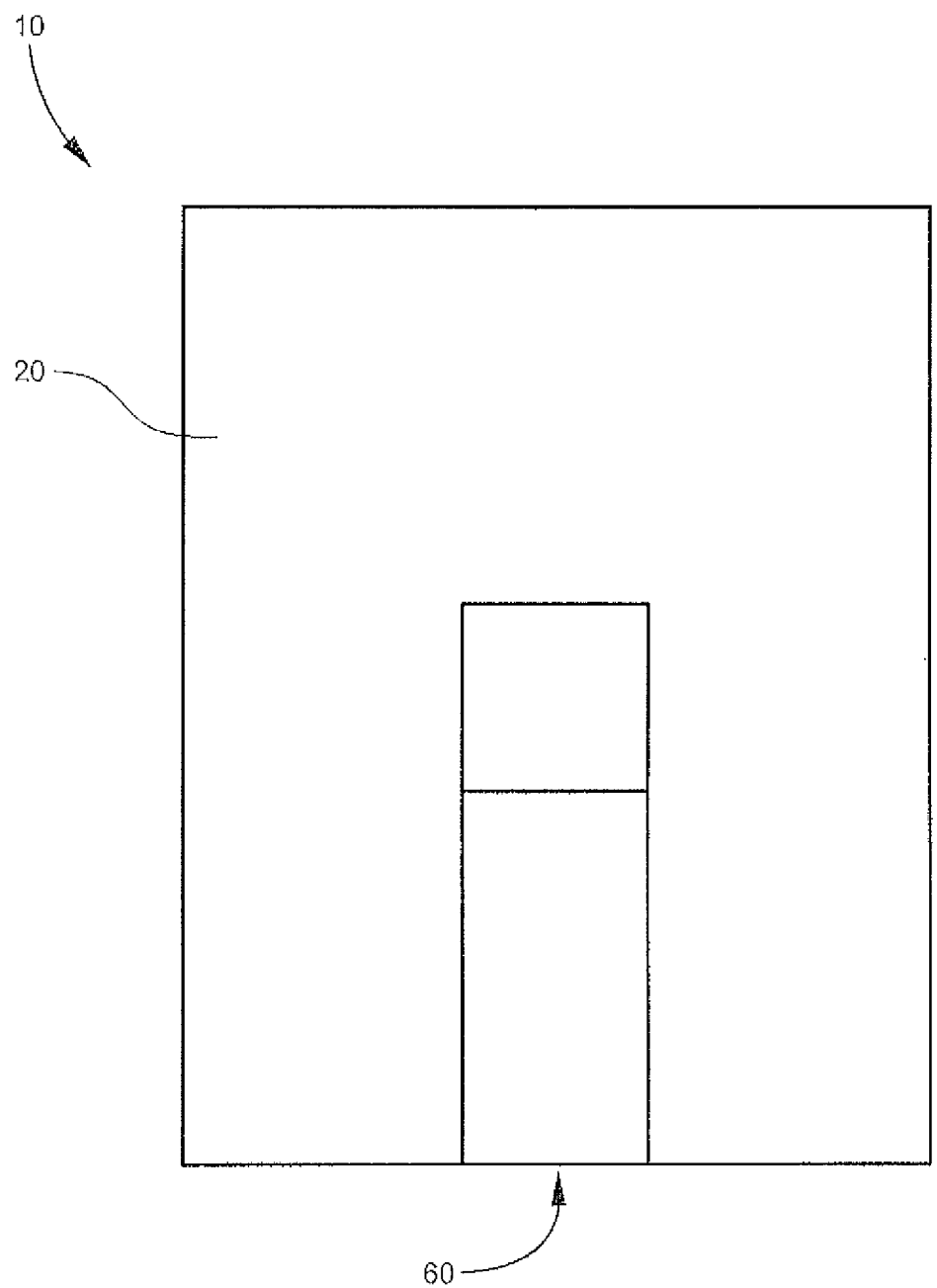
FIG. 23 is a front side view of an embodiment of the cushioned protection device.
Figure 24:
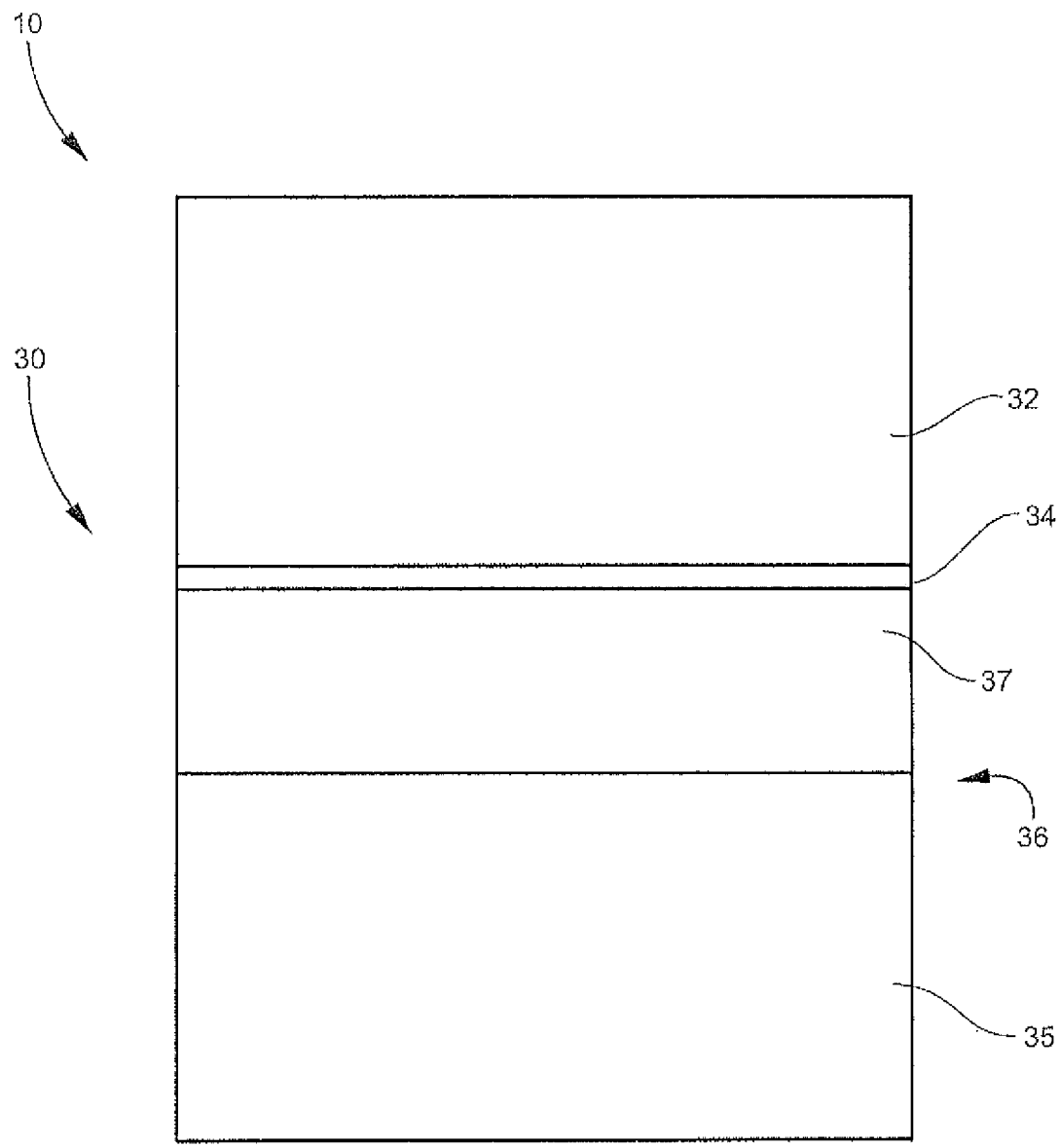
FIG. 24 is a side view of an embodiment of the cushioned protection device.
Figure 25:
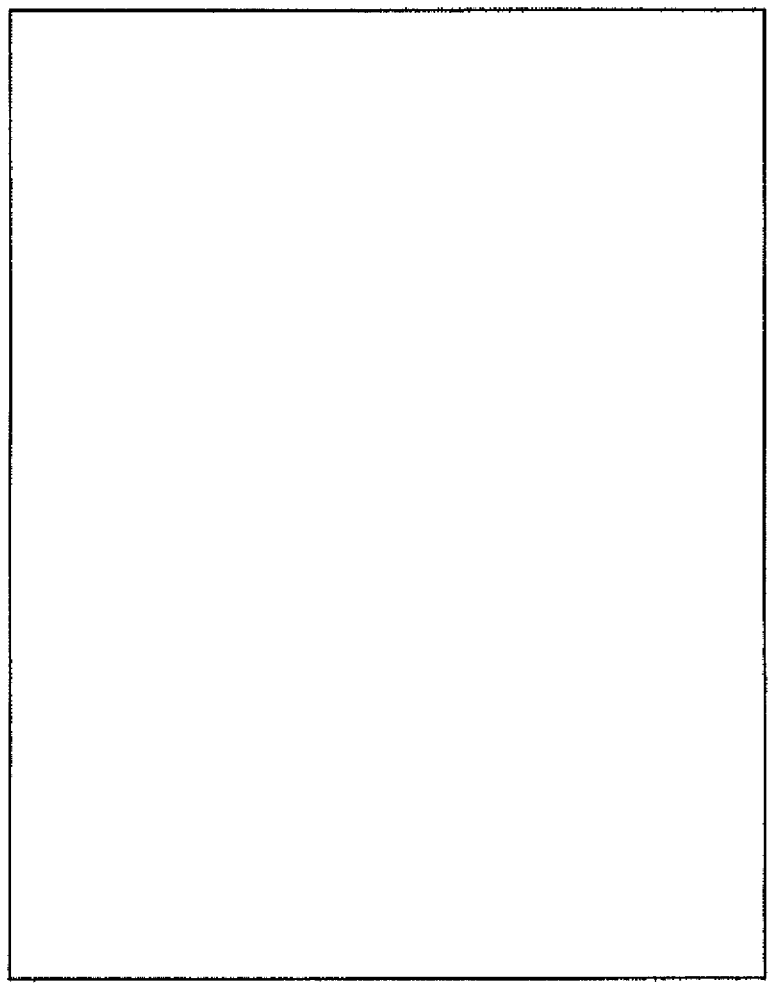
FIG. 25 is a side view of an embodiment of the cushioned protection device.
Figure 26:
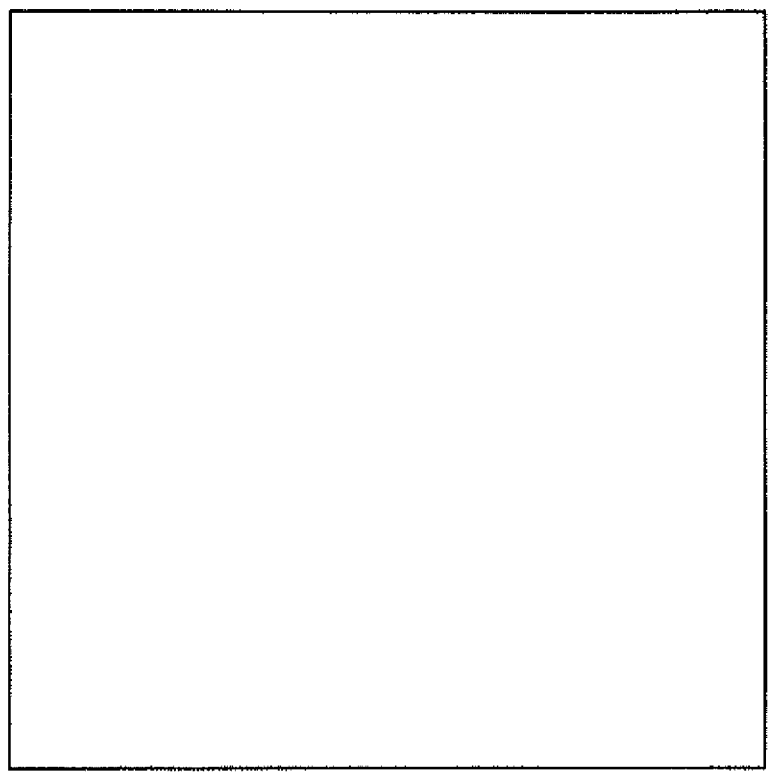
FIG. 26 is a top view of an embodiment of the cushioned protection device.
Figure 27:
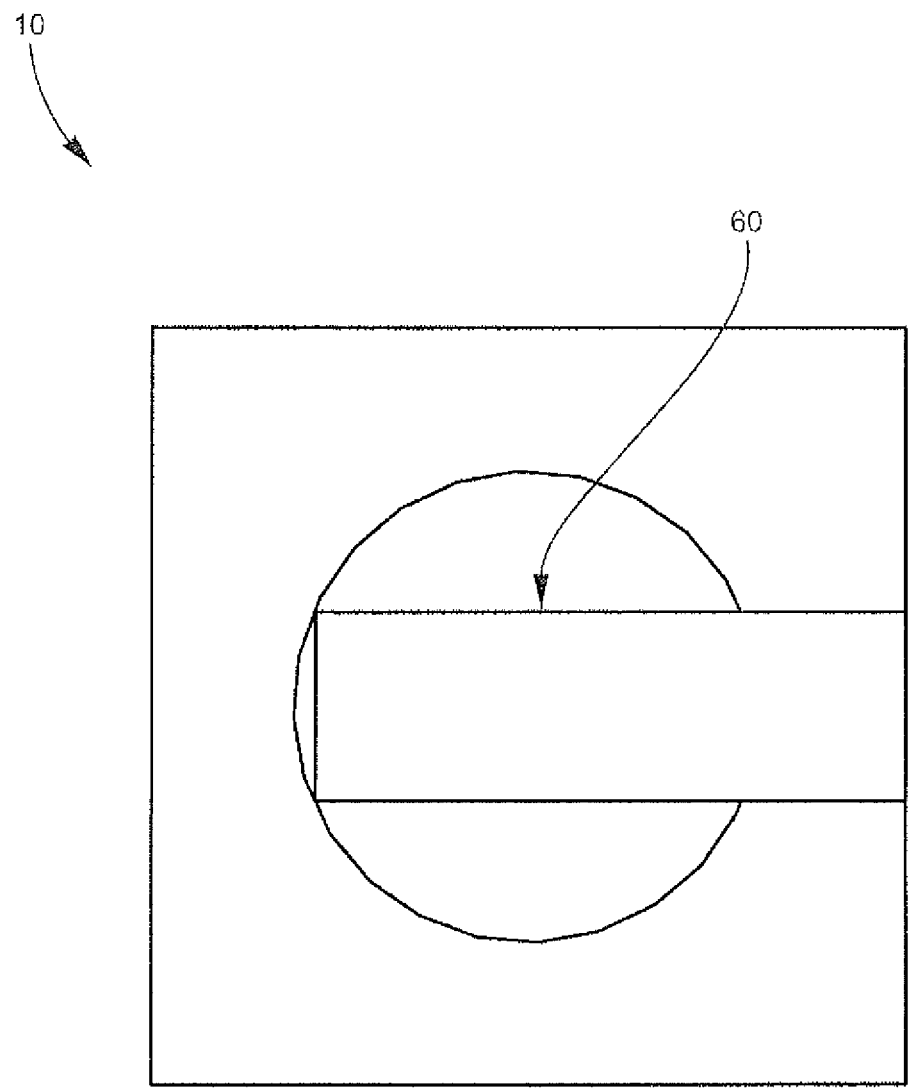
FIG. 27 is a bottom view of an embodiment of the cushioned protection device.

The multi-part design 30 of the cushioned protection device 10 is shown in FIGS. 19, 20, 22, and 24 and may be contrasted with the solid design 20 of the cushioned protection device 10 shown in FIGS. 21, 23, and 25. The multi-part design 30 may include several different layers. Each of these layers may be made from different types of foam. Each of the foams may have different densities, As shown, in FIG. 19, the multi-part design 30 may include three different portions namely an upper protection portion 32 protecting the tailgate 52, a central protection portion 34 for providing rigidity and for providing a secondary cushioning, and a lower protection 36 portion for securing the cushioned protection device to the crank jack. Lower protection portion 36 may be a single piece of foam or may be made from two parts, 35, 37, as shown.

The lower portion 36 may be made from a polyethylene foam having a density of about 1.65 pounds per cubic foot. Where the lower portion 36 is made from two different pieces,—the different pieces 35, 37 are preferably made from the same type of foam. The pieces 35, 37 may be adhered to one another using heat melt, weld, or glue. The foam may be made from a recycled foam. The lower portion houses the cavity 60.

The central portion 34 may be made from a polyethylene foam having a density of about 6 pounds per cubic foot. It may be adhered to the lower portion 36 via heat melt, weld, or glue. The central portion 34 may be made from a solid block of foam, having no portion of the cavity 60 therein, and may be less than 10% of the thickness of the upper portion 32. The upper portion 32 may be made from a polyethylene foam having a density of about 1.7 pounds per cubic foot. It may be adhered to the central portion 34 via heat melt, weld, or glue. Preferably, the upper portion 32 is a solid block wherein no portion of the cavity 60 enters the upper portion 32.

Alternatively, the, cushioned protection device 10 may be made from a single block of foam 20. The single block of foam 20 is made from a polyethylene foam having a density of greater than about 1.7 pounds per cubic foot but less than about 6 pounds per cubic foot.

What is claimed is:

1. A cushioned protection device for protecting a tailgate of a tow vehicle from damage from a trailer comprising a foam block having an internal cavity sized to fit snugly around a top portion of a crank jack attached to the trailer:
   wherein the foam block is made of polyethylene foam;
   wherein the foam block further comprises an upper protection portion for protecting the tailgate from an initial impact, a central protection portion for providing rigidity and for providing a secondary cushioning, and a lower protection portion for securing the cushioned protection device to the crank jack, and
   wherein the upper protection is made from a foam having a density of 1.7 pounds per cubic foot, the central protection portion is made from a foam having a density of 6 pounds per cubic foot, and the lower protection portion is made from a foam having a density of 1.65 pounds per cubic foot.

2. The cushioned protection device of claim 1 wherein the upper protection portion is a solid block.

3. The cushioned protection device of claim 2 wherein the lower protection portion further includes a lower opening defining a lower portion of the internal cavity and a side opening.

4. The cushioned protection device of claim 3 wherein the internal cavity has a shape substantially conforming to the shape of the crank jack.

5. The cushioned protection device of claim 1 wherein the foam block is made from a single piece of foam having a uniform density.

6. The cushioned protection device of claim 1 further comprising a slip covering fitting over the foam block for protecting the block from the elements, for securing the block to the crank jack, and for providing a means for applying advertising indicia.

7. A cushioned protection device for protecting a tailgate of a tow vehicle from damage from a trailer comprising:
   a foam block, made from a polyethylene foam, having an internal cavity sized to fit snugly around a top portion of a crank jack attached to the trailer;
   wherein the foam block further comprises:
   an upper protection portion, consisting of a solid block of foam, for protecting the tailgate from an initial impact;
   a central protection portion for providing rigidity and for providing a secondary cushioning; and
   a lower protection portion having a lower opening defining a lower portion of the internal cavity and a side opening for securing the cushioned protection device to the crank jack;
   wherein the upper protection portion is made from a foam having a density of 1.7 pounds per cubic foot, the central protection portion is made from a foam having a density of 6 pounds per cubic foot, and the lower protection portion is made from a foam having a density of 1.65 pounds per cubic foot; and
   wherein the internal cavity has a shape substantially conforming to the shape of the crank jack.

8. The cushioned protection device of claim 7 further comprising a slip covering fitting over the foam block for protecting the block from the elements, for securing the block to the crank jack, and for providing a means for applying advertising indicia.

9. The cushioned protection device of claim 7 wherein the central protection portion is adhered to the upper protection portion and the lower protection portion by one or more of a heat melt, a weld, or a glue.

10. The cushioned protection device of claim 7 wherein the central protection portion is less than 10% of the thickness of the upper protection portion.

11. A cushioned protection device for protecting a tailgate of a tow vehicle from damage from a trailer comprising:
    a foam block, made from a polyethylene foam, having an internal cavity sized to fit snugly around a top portion of a crank jack attached to the trailer;
    a slip covering fitting over the foam block for protecting the block from the elements, for securing the block to the crank jack, and for providing a means for applying advertising indicia;
    wherein the foam block further comprises:
    an upper protection portion, consisting of a solid block of foam, for protecting the tailgate from an initial impact;
    a central protection portion for providing rigidity and for providing a secondary cushioning; and
    a lower protection portion having a lower opening defining a lower portion of the internal cavity and a side opening for securing the cushioned protection device to the crank jack;
    wherein the internal cavity has a shape substantially conforming to the shape of the crank jack; and wherein the upper, central, and lower protection portions are, respectively, each made from a foam of a different density;
    wherein at least one of the upper, central and lower protection portions are made from a recycled foam.

12. The cushioned protection device of claim 11 wherein the central protection portion is adhered to the upper protection portion and the lower protection portion by one or more of a heat melt, a weld, or a glue.

13. The cushioned protection device of claim 11 wherein the central protection portion is less than 10% of the thickness of the upper protection portion.

* * * * *